US006556581B1

(12) United States Patent
He et al.

(10) Patent No.: US 6,556,581 B1
(45) Date of Patent: Apr. 29, 2003

(54) ETHERNET TO PHASE SHIFT KEY CONVERTER

(75) Inventors: Ming He, Houston, TX (US); Ce Richard Liu, Sugarland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/183,773

(22) Filed: Oct. 30, 1998

(51) Int. Cl.[7] .............................................. H04L 12/56
(52) U.S. Cl. ...................................... 370/419; 370/425
(58) Field of Search ................................ 370/419, 425, 370/349; 375/244, 219, 273, 355

(56) References Cited

U.S. PATENT DOCUMENTS

| 4,571,736 | A | * | 2/1986 | Agrawal | |
| 4,606,051 | A | | 8/1986 | Crabtree et al. | 375/86 |
| 4,686,512 | A | * | 8/1987 | Nakamura et al. | |
| 5,173,900 | A | * | 12/1992 | Miller et al. | 370/349 |
| 5,347,225 | A | | 9/1994 | Graham | 324/523 |
| 5,365,515 | A | | 11/1994 | Graham | 370/17 |
| 5,379,005 | A | | 1/1995 | Aden et al. | 333/24 |
| 5,422,919 | A | | 6/1995 | Graham | 375/200 |
| 5,450,594 | A | | 9/1995 | Aden et al. | 395/200.06 |
| 5,467,061 | A | | 11/1995 | Aden et al. | 333/24 R |
| 5,550,506 | A | | 8/1996 | Tsumura | 329/304 |
| 5,587,692 | A | | 12/1996 | Graham et al. | 333/12 |
| 5,696,790 | A | | 12/1997 | Graham et al. | 375/238 |
| 6,118,827 | A | * | 9/2000 | Wynn | 375/273 |
| 6,212,246 | B1 | * | 4/2001 | Hendrickson | 375/355 |
| 6,320,900 | B1 | | 11/2001 | Liu | 375/219 |
| 6,393,050 | B1 | * | 5/2002 | Liu | 375/219 |

OTHER PUBLICATIONS

Texas Instruments; "Implementing aII/4 Shift D–QPSK Baseband Modem Using the TMS320C50"; Sep. 1996; pp. 1–40.

3Com Corp. website, Robyn Aber; "xDSL Supercharges Copper"; Mar. 1997; pp. 1–5.

Tut Systems website; "Simply delivering xDSL . . . connecting the local loop to the campus, the high rise and throughout the home."; website update Nov. 3, 1997; pp. 1–6.

Zona Research, Inc.; "Compaq Hits Homerun with Tut"; Aug. 11, 1998; pp. 1–2.

* cited by examiner

*Primary Examiner*—Salvatore Cangialosi
(74) *Attorney, Agent, or Firm*—Conley Rose, P.C.

(57) ABSTRACT

A device for seamlessly providing 10BASE-T compatible data communications over an ordinary single twisted-pair home phone line between multiple computers and/or peripherals is disclosed. Each component that is to communicate over a home phone line needs a 10BASE-T compatible network interface card (NIC) for interfacing with the device. A transmit/receive switch is used to switch the device between a transmit mode and a receive mode. When a signal is being transmitted from a component, a Manchester decoder converts the signals received from the NIC into a raw data stream. A differential converter converts the raw data signal received from the NIC to a differential signal. A modulator is used to modulate the signal to a RF signal using a PSK, QPSK, QAM, MCM or similar modulation schemes. A filter is used to limit the bandwidth of the modulated signal and a driver is used to amplify the signal to match the impedance of the phone line. When the device receives a signal over the phone line, the signal is filtered using a bandpass filter and then amplified. The signal is then demodulated using an appropriate demodulation scheme before being differentially encoded. A Manchester encoder encodes the received signal for compatible operation with a receiving NIC.

19 Claims, 5 Drawing Sheets

ETHERNET TO PHASE SHIFT KEY CONVERTER

TECHNICAL FIELD OF THE INVENTION

The invention relates to the field of networking home computer systems, and more particularly, to a method and system for providing 10BASE-T Ethernet compatible data communications between computers and peripherals in a home environment over an single "twisted-pair" phone line that does not conflict with other signals, such as Plain Old Telephone Service (POTS) or Digital Subscriber Line (XDSL) signals, that may be transmitted simultaneously over the same phone line.

DESCRIPTION OF RELATED ART

As more appliances and items in the home become computer controlled and as more homes obtain multiple computer systems, such as one for the "home office" and one for the family, the importance of having a home network system to allow data communications between the various computer systems and peripherals within a home is ever increasing.

Baseband Ethernet technology is currently being used by many businesses for data interconnection between computers. One such commonly-used baseband Ethernet technology is the 10BASE-T network. The 10BASE-T network has an operating rate of 10 Mbps, utilizes the Carrier Sense Multiple Access/Collision Detect (CSMA/CD) access protocol, baseband signaling and Manchester data encoding.

A standard 10BASE-T Network Interface Card (NIC) is typically used in the construction of a 10 Mbps Ethernet Local Area Networks (LANs) utilizing unshielded twisted-pair wire. Under the 10BASE-T standard, workstations are cabled using pairs of twisted-pair wire (one twisted-pair set being used for transmission and another twisted-pair set for reception) to Medium Access Units (MAUs). Each MAU normally has a built-in Attachment Interface Unit (AIU) that can be cabled to a coaxial transceiver connected to coaxial cable.

However, because home phone lines are traditionally considered to be a narrowband communications links permitting only a low data rate signal, bringing Ethernet to the home environment would ordinarily have required new wiring in virtually every home. It is therefore desirable to have a system that permits Ethernet-class data communications systems to be implemented in a home environment without requiring recabling.

Some proposed solutions to this home networking problem include the use of standard modem technology and digital subscriber line (xDSL) technology. One of the problems with standard modem technology is that it is currently limited to data speeds of 56 Kbps (by technology) (and to about 53 Kbps by FCC regulations) and further requires very complicated circuitry. Although XDSL technology can transmit data at a much higher rate that standard modem technology, potentially up to 4 Mbps, the cost of implementing this technology is very high and additionally it requires quite complicated modulation methods.

Yet another proposed solution to the home networking problem is a wireless solution. Wireless solutions are currently very expensive to implement and do not yet have the reliability of wired solutions.

One existing wireline home networking product is the HR1300T product of TUT Systems. The HR1300T system uses a "time modulation line code" to provide an in-home network over existing phone lines. However, this modulation scheme permits only a, relatively slow, 1.3 Mbps data rate.

Therefore, it will be appreciated by those of ordinary skill in the art that there is a need to provide a low-cost home networking solution that can provide high data rates and yet is both easy to install and use even while being compatible with the use of a single twisted pair wireline cable in a home environment.

SUMMARY OF THE INVENTION

In one aspect, the present invention overcomes the above-identified problems as well as other shortcomings and deficiencies of existing technologies by providing a system and method that enables seamless 10BASE-T Ethernet compatible data communications between computers and peripherals over standard single "twisted-pair" phone line that does not conflict or interfere with other signals, such as POTS or xDSL signals, that are being transmitted over the same phone line.

The present invention further provides a system and method for seamless 10BASE-T compatible data communications over an standard single "twisted-pair" home phone line between multiple computers, between computers and peripherals or between multiple peripherals. In one aspect of the present invention, each component that is to communicate over the home phone line has a 10BASE-T compatible Network Interface Card (NIC) for interfacing with the device.

The device of the present invention includes a Manchester coder, a pair of differential converters, a baseband processor, a modulator, a demodulator, filters, amplifiers, and a transmit/receive switch. A transmit/receive switch is used to switch the device between a transmit mode and a receive mode. When a signal is being transmitted from a component, the Manchester coder decodes signals received from the NIC. A differential converter is used to convert the differential signal received from the NIC to a unitary signal. A modulator is next used to modulate this unitary signal to a Radio Frequency (RF) signal using a selected modulation scheme, e.g., the Phase Shift Keying (PSK), Quadrature Phase Shift Keying (QPSK), Quadrature Amplitude Modulation (QAM) or Multicarrier Modulation (MCM) schemes.

A filter is used to limit the bandwidth of the modulated signal while a driver is used to amplify the signal to match the impedance of the phone line. When the device is receiving a signal from the phone line, the received signal is filtered with a bandpass filter and amplified using an amplifier. The signal is demodulated using an appropriate demodulation scheme. The demodulated signal is differentially encoded. The Manchester coder encodes the signal and sends it to the receiving NIC.

BRIEF DESCRIPTION OF THE DRAWINGS

A more complete understanding of the method and system of the present invention may be obtained by reference to the Detailed Description Of The Preferred Embodiment(s) that follow, taken in conjunction with the accompanying Drawings, wherein.

DESCRIPTION OF THE PREFERRED EMBODIMENT

Figure 1:
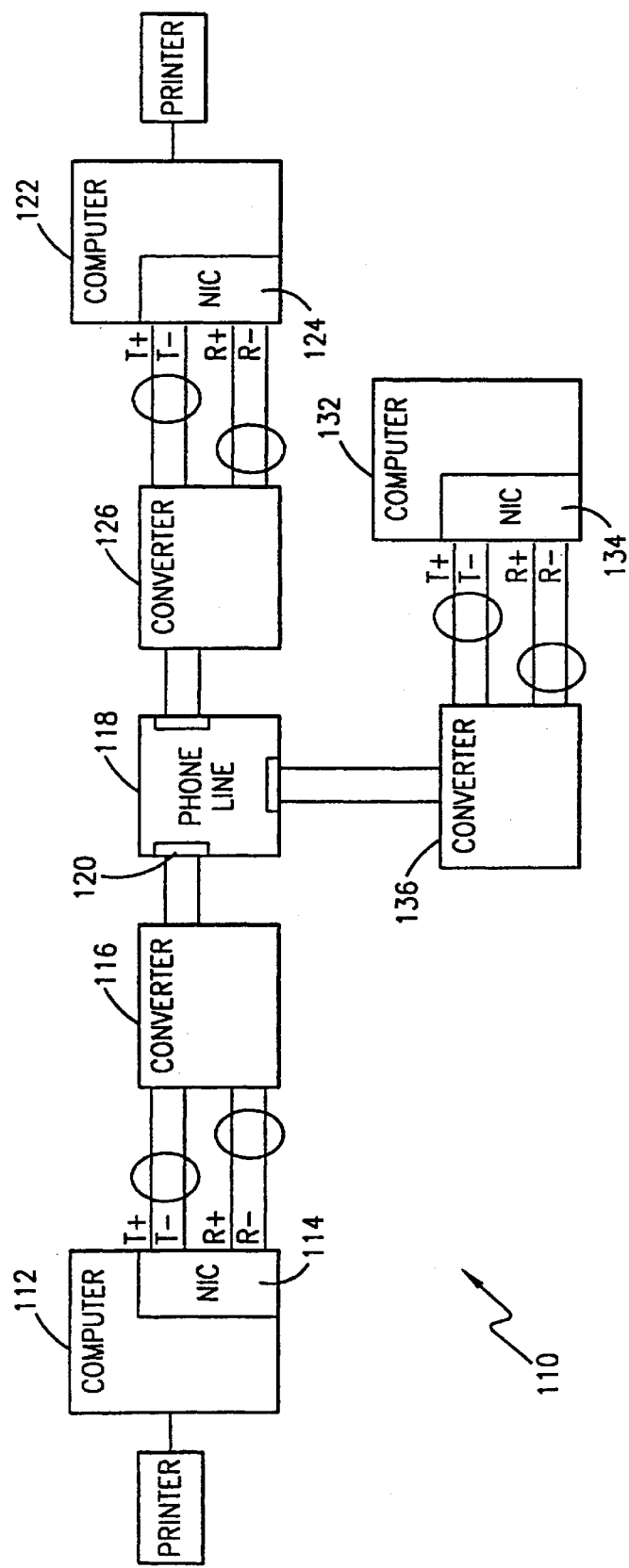
FIG. 1 is a block diagram of an exemplary home utilizing the present invention.

With reference to FIG. 1, there is shown a block diagram of a home 110 in which an exemplary embodiment of the present invention is utilized to provide high-rate data communications between multiple computers and peripherals connected to a single-twisted-pair home phone line. The twisted-pair phone line thus acts like a data communications bus.

As depicted in FIG. 1, the home 110 includes multiple computers 112, 122 & 132. Each of the computers 112 include an associated Network Interface Card (NIC) 114, 124 & 134 respectively. The NIC of each computer is connected to a converter, such as the exemplary converter 116. The exemplary converter 116 of computer 112 is, in turn, connected to a twisted-pair the phone line 118 running through the home 110 through a standard phone jack 120.

In this exemplary embodiment of the present invention, each of the NICs 114, 124 & 134 are standard 10BASE-T network interface cards. As will be appreciated by those skilled in the art, a standard 10BASE-T NIC uses two twisted-pair wire sets for the reception and transmission paths for the data communication. The first twisted-pair is used for the transmission of data (T+, T−) and the second twisted-pair is used for receiving data (R+, R−) Still referring to FIG. 1, the converters 116, 126 & 136, which serve as the interface, connect each of the computers 112, 122 & 132 to the phone line 118, allow data to be exchanged between each pairs of computers over the phone lines at a rate of 10 Mbps without requiring the use of a hub or a router.

A more detailed description of exemplary converter 116 is given below with reference to FIG. 2. In the exemplary embodiment of the present invention shown in FIG. 2, it has been found desirable for the converters 116, 125 & 136 to operate seamlessly with respect to each of the computers 112, 122 & 132 respectively and their corresponding NICs 114, 124 & 134 respectively, i.e., the data communication between each of the pairs of computers appears to be a 10BASE-T Ethernet Local Area Network (LAN) to each of the computers 112, 122 & 132 and their corresponding NICs 114, 124 & 134.

Figure 2:
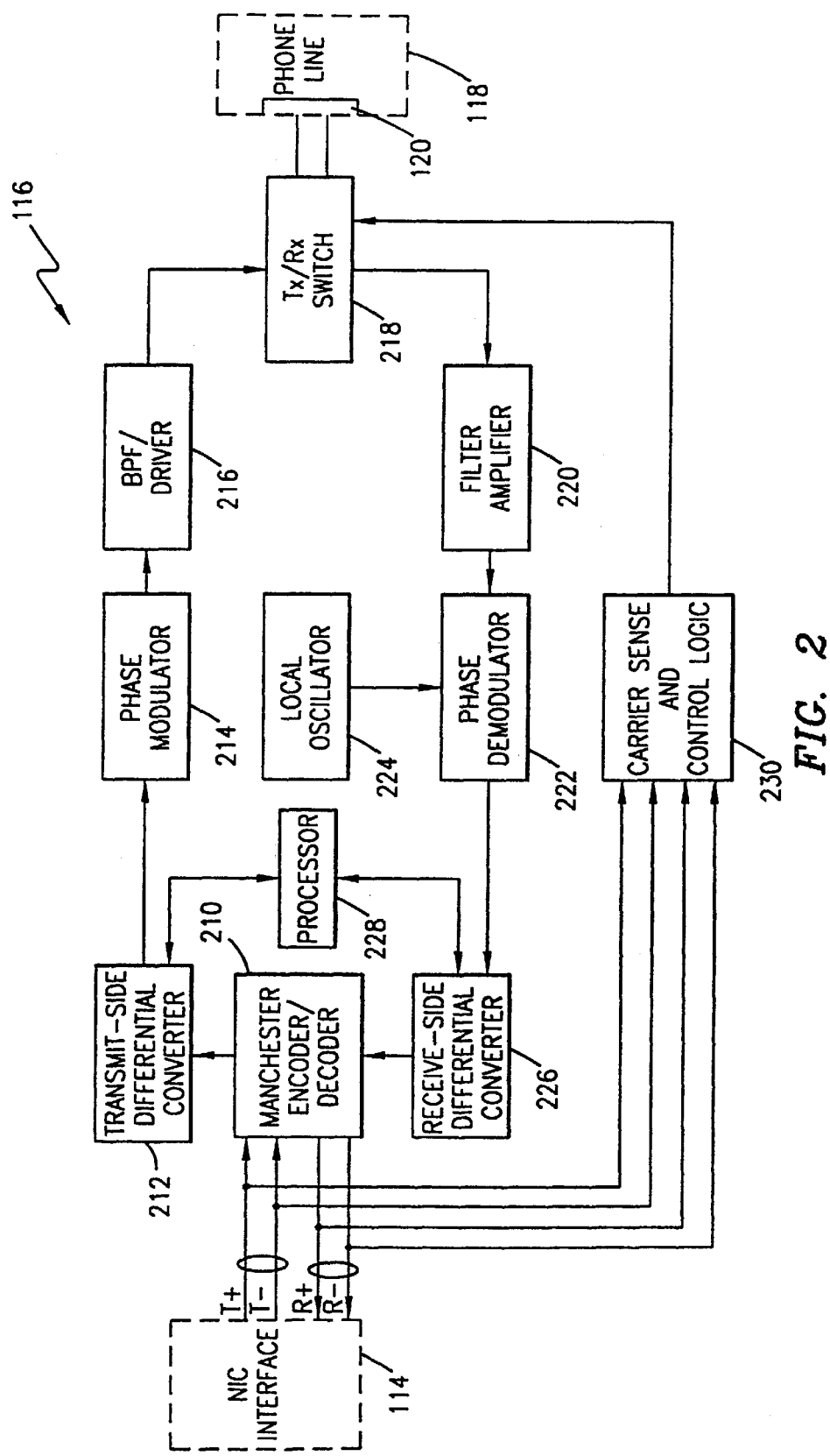
FIG. 2 is a schematic block diagram of an exemplary system embodying the present invention.

Referring next to FIG. 2, there is illustrated therein a more detailed exemplary embodiment of the converter 116 of FIG. 1. As depicted, converter 116 includes a Manchester encoder/decoder 210, a transmit-side differential converter 212, a phase modulator 214, a bandpass filter/driver 216, a transmit/receive switch 218, a filter/amplifier 220, a phase demodulator 222, a local oscillator 224, a receive-side differential converter 226, a control processor 228 and carrier sense and control logic 230. The converter 116 interfaces between a NIC 114 and a phone jack 120 associated with a single twisted-pair phone line 118. It has been found preferable for the NIC 114 to be a standards-compliant 10BASE-T NIC.

Still referring to FIG. 2, the operation of the exemplary converter 116 is described below. The exemplary converter 116 is operable in two modes: a transmit mode and a receive mode. The default operating mode of converter 116 is its receive mode. When a signal is to be transmitted by NIC 114 through converter 116, converter 116 switches to the transmit mode only when there are no signals sensed on the phone line 118 by carrier sense and control logic 230. If no signals are sensed on the phone line 118, the carrier sense and control logic 230 switches the converter 116 to the transmit mode.

As described herein above, the 10BASE-T NIC ordinarily utilizes two twisted-pair wire sets, one pair being used for transmitting differential data signals (T+, T−), and the other pair being used for receiving differential data signals (R+, R−). When a 10BASE-T NIC transmits data, the data is ordinarily encoded using a Manchester code. Therefore the differential data signals being transmitted from NIC 114 over the T+ and T− lines and received by the Manchester encoder/decoder 210 are Manchester encoded differential data signals. The Manchester encoder/decoder 210 decodes the differential transmit data received from NIC 114 and sends the signals to the transmit-side differential converter 212. The decoded transmit data signals processed by the Manchester encoder/decoder 210 are then differentially converted by the transmit-side differential convertor 212 as described below with reference to FIG. 4.

The differentially converted data signal is then sent to phase modulator 214. Phase modulator 214 modulates the signal to a Radio Frequency (RF) signal using a relatively standardized phase modulation scheme, e.g., Differential Binary Phase Shift Keying (DBPSK), Differential Quadrature Phase Shift Keying (DQPSK). Although good results have been achieved with the carrier used in the modulation having a center frequency of 30 MHz with a frequency band of either 21.2–38.8 MHz for DBPSK or a frequency band of 25.6–34.4 for DQPSK, it is contemplated that the present invention is not limited to these center frequencies or these frequency ranges. These modulation schemes and frequencies allow the data to be communicated over the phone lines without being interfered with or interfering with other POTS and xDSL signals being transmitted simultaneously over the phone lines.

Although the present invention utilizes phase modulation, it is contemplated that other types of modulation schemes could also be used such as, but not limited to, Multicarrier Modulation (MCM) and Quadrature Amplitude Modulation (QAM). It is also contemplated that the modulation process can be analog or digital, depending on the implementation.

The modulated data signal is then sent to Bandpass Filter/Driver 216 where the signal is filtered with a bandpass filter to limit the bandwidth of the data signal as well as being amplified by a line driver to match the impedance of the phone line. The data signal is then sent through the Tx/Rx switch 218 to the phone line 118. When the carrier sense and control logic 230 detects that the NIC 114 has finished transmitting an outgoing data signal or if there are no signals sensed on the phone lines, the carrier sense and control logic 230 switches the Tx/Rx switch 218 back to the receive mode, the default mode.

When receiving modulated data signals from the phone line 118, the modulated signal is bandpass filtered and amplified by filter/amplifier 220. The filtered signal is then demodulated by phase demodulator 222 using an appropriate demodulation scheme. The demodulated signal is then differentially converted by a receive-side differential converter 226 as discussed below with reference to FIG. 3. The signal from differential converter 226 is then encoded by Manchester encoder 210 and sent as a differential signal pair to NIC 114 over the R+ and R− lines.

As described hereinabove, the carrier sense and control logic 230 is used to activate the Tx/Rx switch 218 for switching the converter 116 between the transmit and the receive modes. The signals from NIC 114 are used to determine if whether or not the NIC 114 is willing to "talk" to other devices, etc. If NIC 114 wants to "talk", the carrier sense and control logic 230 needs to determine if the phone line 118 are available. It does this using standard Ethernet Carrier Sense Multiple Access/Collision Detection (CSMA/CD) scheme.

The baseband processor 228 primarily controls three functions: the differential decoding and encoding performed by differential converters 212 & 226 as well as clock recovery with local oscillator 224. In the "transmitting path" when data signals are being sent from NIC 114 through converter 116 as described hereinabove, they will have known clock information which is recovered with local oscillator 224.

Those skilled in the art can realize that the teachings of the present invention as described hereinabove provides a method and apparatus that enables 10BASE-T Ethernet compatible data communications between computers and peripherals over an ordinary single twisted-pair phone line without conflicting with other signals, such as POTS and XDSL signals, being simultaneously transmitted over the same single twisted-pair phone lines.

It will be further appreciated by those ordinary skill in the art that the present invention provides a device for seamlessly providing 10BASE-T compatible data communications over an ordinary single twisted-pair home phone line between multiple computers, between computers and peripherals or between multiple peripherals. A transmit/receive switch 218 is used to switch the device between a transmit mode and a receive mode. When data signals are being transmitted from a computer 112, a Manchester coder decodes signals received from the NIC. A transmit-side differential converter 212 is used to convert the differential signal received from the NIC to a single signal.

A modulator is used to modulate the signal to a RF signal using a modulation scheme such as PSK, QPSK, QAM or MCM schemes. A filter is used to limit the bandwidth of the modulated signal and a driver is used to amplify the signal to match the impedance of the phone line. When the device is receiving signal from the phone lines, the signal is filtered with a bandpass filter and amplified with an amplifier. The signal is demodulated with a demodulator using an appropriate demodulation scheme. The demodulated signal is differentially encoded with a differential converter. The Manchester coder encodes the signal and sends the signal back to the receiving NIC of a component.

Figure 3:
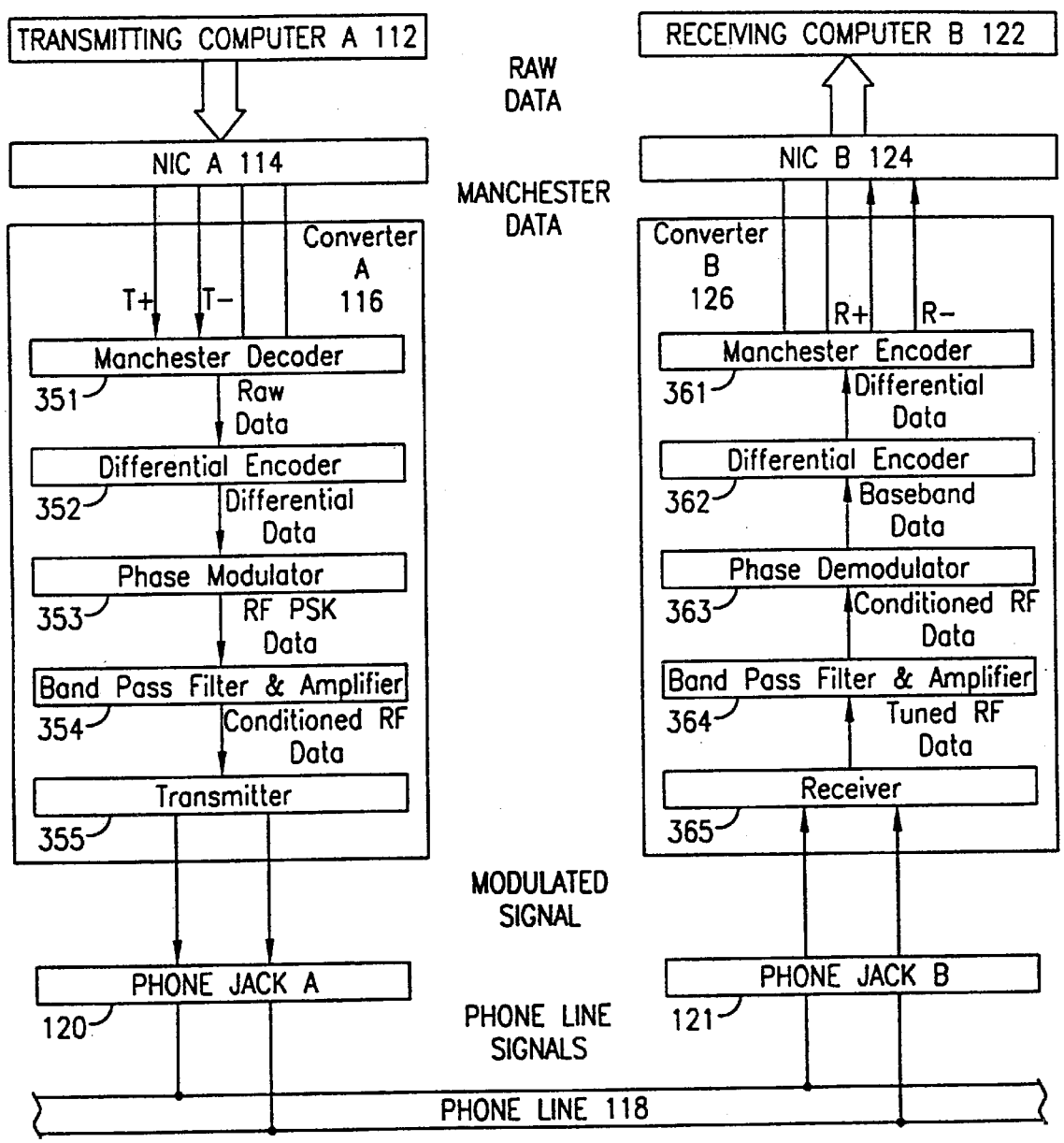
FIG. 3 is a data flow diagram of the present invention.

FIG. 3 is a data flow diagram of the present invention. In the exemplary illustration of the data conversion process involved in using the converters of the present invention, FIG. 3 shows a Transmitting Computer A 112 communicating with a Receiving Computer B 122. The Transmitting Computer A 112 has a Network Interface Card (NIC) 114 while the Receiving Computer B 122 has a NIC 124. As can be seen from FIG. 3, the Transmitting Computer 112 sends raw data to NIC 114 which converts the raw data into four-line Manchester-encoded data which is then forwarded to converter 116. The Manchester decoder 351 of converter 116 converts the Manchester-encoded data back into raw data. The raw data is then processed through a differential encoder 352 that converts the raw data into differential format. It is a key characteristic of differential data that each bit of information is a symbolic representation of the relative value of a bit of data compared to the value of the preceding bit in the data stream.

The differential data is then fed to a phase modulator 353 that converts the differential data into Radio Frequency (RF) Phase Shift Keyed (PSK) data. In one embodiment of the present invention the PSK encoding is done using Differential Binary Phase Shift Keying (DBPSK). In an alternative embodiment of the present invention, the PSK encoding is done using Differential Quadrature Phase Shift Keying (DQPSK). The Radio Frequency (RF) PSK data is then fed to a bandpass filter and line driver 354 that conditions the RF data into a format suitable for transmission over telephone wires. The conditioned data is then fed to the transmitter 355 which places the signal through a two-wire phone jack 120 on the phone line 118.

As explained elsewhere in this application, the transmitting computer 112 places the signals on the phone line 118 only after verifying (using the CSMA/CD mechanism) that no other computer connected to the phone line 118 is currently transmitting messages over the phone line. If the CSMA/CD mechanism detects the existence of ongoing transmissions over the phone line 118, the system signals the transmitting computer 112 via the NIC 114 to refrain from starting a transmission till the phone line 118 are available for originating a message.

The modulated signals are carried over the phone line 118 to the phone jack 121 associated with the target (receiving) computer 122. The Receiving Computer 122 is connected to the phone lines via an NIC 124, a converter 126 and the phone jack 121. At the Receiving Computer 122, the modulated phone line signals are received over a two-wire connection by the receiver 365 in the converter 126. The receiver transmits the tuned Radio Frequency (RF) data to a bandpass filter and amplifier 364 that conditions the RF data received from the receiver 365. The conditioned RF signals are then fed to the phase demodulator 363 which converts the RF data into baseband data.

The baseband data is then processed by a differential encoder 362 that generates differential data that is in turn fed to a Manchester encoder 361 to generate Manchester encoded data that is compatible with the NIC 124. In an alternative embodiment of the present invention, the output of the phase demodulator 363 is fed directly to the Manchester encoder 361. In yet a different embodiment of the present invention the output of the phase demodulator is differentially encoded data that is fed to a differential decoder (not shown in the figure) to generate raw data that is then fed the Manchester encoder 361. The Manchester encoded data received by the NIC 124 is then routed to an appropriate port of the receiving computer 122 typically over a computer bus.

Thus, in summary, the process of data transmission using the system and method of the present invention involves the conversion of Manchester encoded data into a data compatible for transmission over a two-wire telephone line. In the preferred embodiment of the present invention, the transport protocol essentially builds upon the use of differential data signals that can be carried over a two-wire line. In an extension of the system and method of the present invention, the NIC 114 & 124 may be substituted with a direct differential encoder/decoder mechanism. However, this customized extension will make it necessary to have a different interface card for use with the phone system than for use with regular four-line network interfaces.

Figure 4:
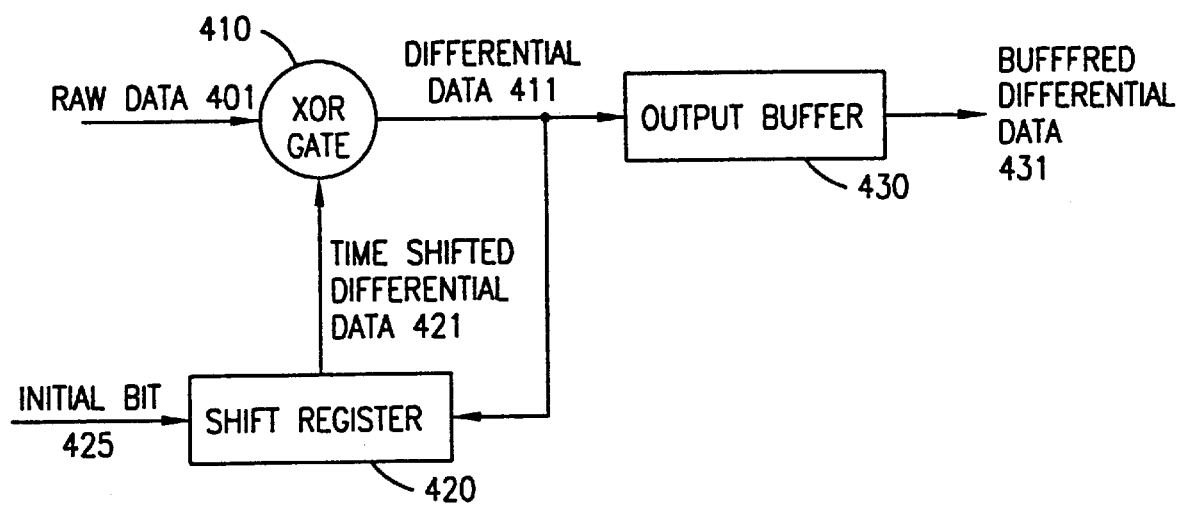
FIG. 4 is a logic flow diagram of the differential encoder of the present invention.

FIG. 4 is a logic flow diagram of the differential encoder of the present invention. As shown in FIG. 4, the raw data 401 is fed to one of the inputs of an XOR gate 410. The other input of the XOR gate is connected via a shift register to the output of the XOR gate. Thus the differential data 411 that is generated at the output of the XOR gate 410 is fed to both an output buffer 430 as well as to a shift register 420.

The shift register 420 thus acts as a one-bit storage device needed for the generation of time-shifted differential data 421. The raw data 401 and the time-shifted differential data 421 are fed to the XOR gate 410 as shown in FIG. 4 to generate the next bit of differential data 411. This differential data 411 is buffered using the output buffer 430 before being fed to the next stage of the system. It should be noted that at startup, the shift register 420 will not contain any information about the "preceding" bit. In order to permit a consistent startup sequence, the initial bit 425 is set to the value "1" as shown in FIG. 4.

Figure 5:
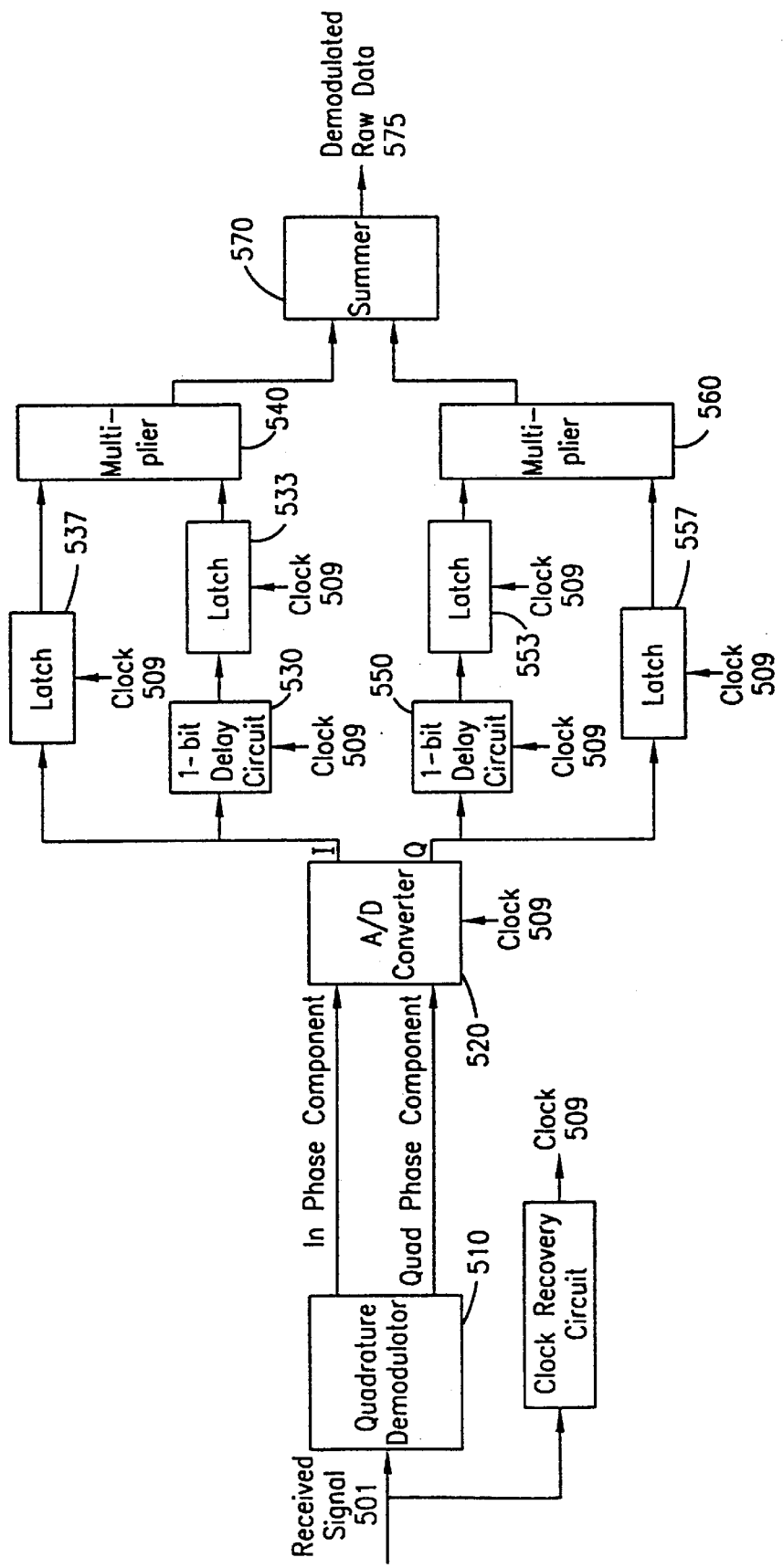
FIG. 5 is a schematic diagram of the receiver of the present invention.

FIG. 5 is a schematic diagram of the receiver portion of the baseband processor. As shown in FIG. 5, the received signal 501 is first separated into in-phase and quadrature-phase components by the quadrature demodulator 510. The in-phase component and the quad-phase components are then fed to an Analog-to-Digital (A/D) converter 520. A clock recovery circuit 505 uses the received signal 501 to recover the clock signal 509.

The in-phase component of the received signal 501 is fed directly to latch 537 and indirectly to latch 533 after a one-bit delay (implemented using a one-bit delay circuit 530). These time-offset latched in-phase received signals are then multiplied using a multiplier 540. In an analogous manner, the quad-phase component of the received signal 501 is fed to a similar pair of latches 553 (with a one-bit delay through a delay circuit 550) and directly to 557. These latched time-offset quad-phase component signals are then multiplied using a multiplier 560. The output of the multipliers 540 & 560 are fed to a summer 570 to generate a demodulated raw datum 575.

The delay circuits 530 & 550 act as one-bit storage devices to store $S_{I0}$ and $S_{Q0}$. The latches 533, 537, 557 & 553 are used for synchronization purposes. The clock signal 509 generated by the clock recovery circuit 505 is fed into the A/D converter 520, the latches 533, 537, 553 & 557 and the delay circuits 530 & 550. The differential decoder implements the constellation identification algorithm using digital logic circuits.

As would be well recognized by those of ordinary skilled in the art, the major difficulties in using the DBPSK modulation scheme are the problems of carrier recovery and synchronization, the phase ambiguity of the DPSK signal and the problem of recovering timing information at the receiver. The use of a quadrature demodulator eliminates the carrier recovery problem. The differential coding mechanism solves the phase ambiguity problem involved with using the DPSK signal.

In summary, in the receiving path, the quadrature demodulator gives two channels of signals: an in-phase component and a quad-phase component. These signals are first digitized using a high-speed A/D conversion chip. The constellation identification algorithm is implemented using digital logic chips. High-speed shift registers are used to shift and buffer the output of the A/D device. The combinational logic is implemented using high-speed inverters, AND gates and XOR gates. The shift registers are D-type flip/flops (implemented using 74 ACT parts).

Although a preferred embodiment of the method and apparatus of the present invention has been illustrated in the accompanying Drawings and described in the foregoing Detailed Description, it is to be understood that the invention is not limited to the embodiment(s) disclosed, but is capable of numerous rearrangements, modifications and substitutions without departing from the spirit of the invention as set forth and defined by the following claims.

What is claimed is:

1. A network converter that comprises:
    an encoder/decoder configured to convert an encoded transmit signal received from a network interface card into a decoded transmit signal, and further configured to convert a decoded receive signal into an encoded receive signal that, is provided to the network interface card;
    a transmit-side differential converter configured to convert the decoded transmit signal into a differential transmit signal;
    a phase modulator configured to convert the differential transmit signal into a modulated radio frequency signal;
    a bandpass filter configured to convert the modulated radio frequency signal into a transmit signal that travels over a two wire medium;
    an amplifier configured to convert a receive signal from the two wire medium into a filtered radio frequency receive signal;
    a phase demodulator configured to convert the filtered radio frequency receive signal into a baseband receive signal; and
    a receive-side differential converter configured to convert the baseband receive signal into the decoded receive signal provided to the encoder/decoder.

2. The network converter of claim 1, wherein the encoder/decoder is a Manchester encoder/decoder.

3. The network converter of claim 1, wherein the encoded transmit signal and the encoded receive signal comply with 10BASE-T Ethernet protocol.

4. The network converter of claim 3, wherein the transmit and receive signals are differential binary phase shift keyed (DBPSK) signals.

5. The network converter of claim 1, wherein the transmit and receive signals are differential quadrature phase shift keyed (DQPSK) signals.

6. The network converter of claim 1, wherein the two wire medium is a twisted wire pair.

7. A system for data communications, the system comprising:
    two or more computing devices each having an associated network interface card;
    a two wire medium; and
    two or more network converters each coupled between the two wire medium and a respective one of the network interface cards, wherein each network converter is configured to communicate over the two wire medium using a differential phase shift key modulated signal.

8. The system of claim 7, wherein each network converter includes:
    a transmit-side differential converter configured to convert a binary transmit signal into a differential transmit signal;
    a phase modulator configured to convert the differential transmit signal into a modulated radio frequency signal; and
    a bandpass filter configured to convert the modulated radio frequency signal into a transmit signal that travels over a two wire medium.

9. The system of claim 8, wherein the transmit-side differential converter produces the differential transmit signal by combining each bit of the binary transmit signal with a previous bit of the differential transmit signal.

10. The system of claim 8, wherein each network converter further includes:
- an amplifier configured to convert a receive signal from the two wire medium into a filtered radio frequency receive signal;
- a phase demodulator configured to convert the filtered radio frequency receive signal into a baseband receive signal; and
- a receive-side differential converter configured to convert the baseband receive signal into a decoded receive signal.

11. The system of claim 10, wherein each network converter further includes:
- an encoder/decoder configured to convert an encoded transmit signal received from a network interface card into said binary transmit signal, and further configured to convert said decoded receive signal into an encoded receive signal that is provided to the network interface card.

12. The system of claim 11, wherein the encoder/decoder is a Manchester encoder/decoder.

13. The system of claim 7, wherein each network converter is further configured to convert an Ethernet signal from the respective one of the network interface cards to a transmitted differential phase shift key modulated signal, and is further configured to convert a received differential phase shift key modulated signal to an Ethernet signal to the respective one of the network interface cards.

14. A method of establishing computer communication over a two wire medium, the method comprising:
- receiving an encoded transmit signal from a network interface card;
- decoding the encoded transmit signal to obtain a decoded transmit signal;
- converting the decoded transmit signal into a differential transmit signal;
- phase modulating a radio frequency signal in accordance with the differential transmit signal; and
- coupling the phase modulated radio frequency signal to the two wire medium.

15. The method of claim 14, further comprising:
- receiving a phase modulated radio frequency signal from the two wire medium;
- demodulating the received phase modulated radio frequency signal to obtain a baseband signal;
- processing the baseband signal with a differential converter to obtain a decoded receive signal;
- encoding the decoded receive signal to obtain an encoded receive signal; and
- providing the encoded receive signal to a network interface card.

16. The method of claim 14, wherein the encoded transmit signal is a 10BASE-T Ethernet signal.

17. The method of claim 14, wherein the two wire medium is a twisted wire pair.

18. The method of claim 14, wherein the phase modulated signal is one of a differential binary phase shift keyed signal and a differential quadrature phase shift keyed signal.

19. The method of claim 14, wherein said converting includes:
- storing bits from the differential transmit signal in a delay element; and
- combining bits from the delay element with bits from the decoded transmit signal to produce bits in the differential transmit signal, wherein said combining employs a logical XOR operation.

* * * * *